US006454166B1

(12) United States Patent
Stenzel et al.

(10) Patent No.: US 6,454,166 B1
(45) Date of Patent: Sep. 24, 2002

(54) SECURITY DOCUMENT WITH A SECURITY COMPONENT AND METHOD FOR THE PRODUCTION THEREOF

(75) Inventors: Gerhard Stenzel, Germering; Wittich Kaule, Emmering, both of (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/978,001

(22) Filed: Oct. 17, 2001

Related U.S. Application Data

(62) Division of application No. 08/894,371, filed on Oct. 28, 1997.

(30) Foreign Application Priority Data

Dec. 22, 1995 (DE) ........................................ 195 48 528

(51) Int. Cl.[7] .................................................. G06K 7/08

(52) U.S. Cl. ....................... 235/449; 235/494; 235/493; 235/382; 283/67

(58) Field of Search ................................ 235/493, 494, 235/449, 487, 382; 283/67

(56) References Cited

U.S. PATENT DOCUMENTS

| | | | | | |
|---|---|---|---|---|---|
| 4,092,526 | A | * | 5/1978 | Beck | 235/419 |
| 5,354,099 | A | * | 10/1994 | Kaule et al. | 283/82 |
| 5,563,401 | A | | 10/1996 | Lemelson | |
| 5,599,047 | A | * | 2/1997 | Kaule et al. | 283/82 |
| 5,803,503 | A | | 9/1998 | Kaule et al. | |
| 6,318,758 | B1 | * | 11/2001 | Stenzel et al. | 283/72 |
| 6,343,745 | B1 | * | 2/2002 | Bohm et al. | 235/493 |

* cited by examiner

*Primary Examiner*—Michael G. Lee
*Assistant Examiner*—Steven S. Paik
(74) *Attorney, Agent, or Firm*—Bacon & Thomas

(57) ABSTRACT

A method of producing a security element, and/or a security document that includes a security element, includes the steps of (a) providing first gaps in a first layer of the security element and in a magnetic layer disposed below the first layer, the first gaps forming negative characters readable upon transmission of light through the document, and (b) providing second gaps in the magnetic layer, the second gaps forming a magnetic coding.

15 Claims, 17 Drawing Sheets

3
4

3
4
11

3
4
5
11

3
4
5
8

3
4
5
8
6

3
4
5
14
8
6

3
4
5
9
14
8
6

3
4
5
9
14
8
6
7

SECURITY DOCUMENT WITH A SECURITY COMPONENT AND METHOD FOR THE PRODUCTION THEREOF

CROSS-REFERENCE TO RELATED APPLICATIONS

This application is a divisional of copending U.S. patent application Ser. No. 08/894,371, filed Oct. 28, 1997, now allowed.

BACKGROUND OF THE INVENTION

1. Field of the Invention

This invention relates to a security document with a security element having at least a first layer with gaps in the form of characters or patterns, and a magnetic layer disposed below said first layer. The invention relates further to such a security element and to methods for producing said element and the document.

2. Discussion of Related Technology

It has been known for some time to provide security documents with plastic security threads having a magnetic coating and thus serving as a machine-readable security feature (DE 16 96 245 A1, EP 0 310 707 A1).

To increase the forgery-proofness of this proven security feature further, it has also been proposed to provide the magnetic coating on the carrier material in discontinuous form. For example EP 0 407 550 A1 describes a security document with an embedded security thread provided with a binary code consisting of magnetic material. Certain bit lengths are defined which are constant over the total length of the strip. The coating of a bit length with magnetic material corresponds for example to a 1 while a bit length without magnetic material corresponds to a 0. The binary code known from EP 0 407 550 A1 is characterized in that it is composed of alternatingly disposed separation segments and word segments whereby the word portion consists of a certain number of bit lengths and the sequence of binary values of the separation segments must not occur within this word length in order to permit clear detection of the word segments.

This security element has the disadvantage, however, that there is no possibility of fast visual checking as is necessary in many situations of daily life.

It has therefore likewise been proposed to combine machine-testable security features with visual features. EP 0 516 790 A1 discloses a security document with such a security element. The security thread described here consists of a transparent plastic carrier layer with a metallic coating in which gaps are provided in the form of characters or patterns, the so-called negative writing. If the thread is present in the paper pulp, these gaps and the metallic surroundings are hardly visible when viewed by reflected light. When viewed by transmitted light, however, the transparent gaps stand out in strong contrast from their opaque surroundings and are thus easily recognized. At the same time the security element has a magnetic coating which can e.g. be disposed congruently below the metal layer so that the gaps are present congruently in both layers. In this case a transparent plastic foil is first printed in the area of the later gaps with an activable ink containing foamable additives for example. Subsequently the plastic foil is provided in consecutive working steps first with a first metal layer, a magnetic layer and a second metal layer. Subsequent activation of the ink, e.g. thermal action, causes the layers to be removed in the area of the activable ink so that the gads arise.

Alternatively the magnetic coating can be provided below the metal layer only in the edge areas of the thread and along the running direction of the element in the document, the gaps being disposed in the metal layer in the intermediate areas free from the magnetic layer. The transparent carrier foil of the thread is printed in the edge areas with magnetic material in the form of strips. In the intermediate areas free from the magnetic layer the activable ink is applied in the form of the later gaps and the carrier foil then coated all over with the metal layer. The following activation of the ink finally gives rise to the gaps in the metal layer.

The invention is based on the problem of proposing a security document with a security element which allows not only a visual check but also machine testing and offers increased protection from forgery.

SUMMARY OF THE INVENTION

The solution to a problem can be seen in the independent claims. Developments are the object of the subclaims.

Hitherto it was impossible to combine a visual feature testable in transmission, such as the negative writing, with a magnetic coding usually consisting of spaced, opaque, magnetic areas. If the coding and the negative writing are provided on the security element independently of each other, there is a danger of the opaque areas of the coding extending into the negative characters or even covering them completely so that the characters are hardly or not at all recognizable in transmission. On the other hand, if one also provides the gaps in the magnetic layer in the overlap areas between magnetic layer and negative characters one can no longer distinguish without doubt between the actual coding and the superimposed characters when reading the coding.

The invention is based on the finding that the extension of the negative characters is in the micron range and therefore a suitable choice of the extension of the magnetic areas and of the material parameters of the magnetic substance influencing the magnetic flux will prevent the readability of the coding from being impaired by the superimposed negative characters.

According to the invention a discontinuous magnetic layer in the form of a coding is therefore provided below the opaque layer surrounding the negative characters, the gaps also being present in the magnetic layer in the areas where the negative character gaps and the magnetic layer overlap.

According to a preferred embodiment the security document has a security element with a translucent or transparent plastic layer on which a magnetic binary coding with a bit length of at least 2 to 4 mm and an opaque metal layer with negative characters are disposed, the metal layer being provided over the coding. In the areas where the negative characters overlap the magnetic layer the magnetic layer also has gaps in the form of the characters. Under the magnetic layer one can likewise dispose, for additional visual protection of the coding, a metal layer, e.g. of aluminum or metallic ink, which likewise has the negative character gaps. The magnetic material and quantitative parameters are selected such that the magnetic flux is roughly twice as high as would be necessary for reading the coding on an uninterrupted thread.

The inventive security element is produced in principle in two steps, in one case producing the magnetic coding and in the other case producing the negative writing. In the following the various possibilities for producing a magnetic coding and visually recognizable negative writing will therefore first be explained independently of each other.

Since a magnetic layer is preferably covered by an essentially opaque protective layer on both sides for protection from forgery, the method variants described in the following include not only the production of the magnetic coding itself but also the possibilities for producing a magnetic coding with a subjacent cover layer. This is preferably a metallic layer which can be produced by any method, such as vacuum metalization, printing with bronze inks or the like. However other layers are of course also conceivable, such as a white color layer. One can also use color layers containing iridescent or liquid-crystal pigments or other optically variable effect layers, such as holograms. Semitransparent layers such as a semitransparent metal layer are likewise conceivable.

Production Variant M1 (for Producing a Magnetic Coding)

The inverse of the desired magnetic coding is printed on a carrier foil with an activable ink as a separation layer. Subsequently the lower cover layer and the magnetic layer are applied all over and uniformly distributed. The separation layer is then activated, e.g. by treatment with a suitable solvent. The dissolving process can possibly be supported by surfactants, ultrasound or mechanical brushing. This causes the separation layer and the superjacent layers to be removed. The magnetic coding remains on the foil.

Production Variant M2 (for Producing a Magnetic Coding)

A continuous lower cover layer is first applied to a carrier foil. The inverse of the magnetic coding is printed thereon with an activable ink as a separation layer. Subsequently the magnetic layer is applied all over and uniformly distributed. In the next operation the separation layer is activated, for example likewise by treatment with a suitable solvent. This process can possibly be supported by surfactants, ultrasound or mechanical brushing. In this way the layers are removed in the area of the separation layer and the magnetic coding remains. However, the lower cover layer is present all over.

Production Variant M3 (for Producing a Magnetic Coding)

The magnetic layer is printed in the desired coding directly on a carrier foil or transferred in the desired coding thereto using a transfer method. The carrier foil can optionally have a cover layer.

Production Variant M4 (for Producing a Magnetic Coding)

The magnetic layer is applied all over to a carrier foil already provided all over with the lower cover layer. Subsequently the pattern of the coding is printed with a strongly adhesive ink. In a further step the magnetic layer is detached in the unprinted areas, possibly supported by ultrasound or mechanical brushing. The protective and strongly adhesive ink layer can optionally be detached subsequently.

Production Variant M5 (for Producing a Magnetic Coding)

The magnetic layer is applied all over to a carrier layer already provided with the lower cover layer. Subsequently the inverse of the magnetic coding is printed with a caustic ink containing e.g. an acid, solvent or completing agent. This causes the unwanted parts of the magnetic layer to be detached and the magnetic coding to remain. The detaching process can again be supported by surfactants, ultrasound or mechanical brushing.

The opaque or at least partly opaque layer having the negative characters can, like the abovementioned first cover layer, consist of a metal layer, an opaque ink, a bronze ink, a hologram or the like. The term "opaque layer" used in the following also includes essentially opaque layers, such as semitransparent metal layers or inks with optically variable pigments such as interference layer pigments or liquid-crystal pigments. For producing the light, visually easily recognized characters against an opaque background one can fundamentally use the following possible methods.

Production Variant V1 (for Producing Gaps)

A translucent carrier foil is printed in the form of the later characters using a soluble ink as a separation layer. This layer structure is subsequently provided with the opaque layer. Then the separation layer is detached with a suitable solvent, which leads to detachment of the superjacent layer.

Production Variant V2 (for Producing Gaps)

A carrier foil is provided with at least one opaque layer by printing or vaporization. Then a strongly adhesive, translucent ink is printed on the uppermost cover layer in the form of the inverse of the later gaps, and the non-covered areas subsequently removed by being etched off or dissolved.

Production Variant V3 (for Producing Gaps)

A carrier foil is printed with an opaque ink containing for example bronze powders, white titanium dioxide pigments or optically variable pigments, the negative characters being left out.

Production Variant V4 (for Producing Gaps)

A carrier foil is printed or vaporized with at least one opaque layer. Then a caustic ink containing for example an acid, solvent or complexing agent is applied to the sequence of layers in the form of the later gaps so that the subjacent layers are removed except for the carrier foil.

These separately specified methods for producing a magnetic coding and negative writing can be combined at will in order to obtain an inventive security element or security document. A carrier foil, preferably in endless form, is provided both with the magnetic coding and with the superjacent negative writing. Subsequently this carrier foil is cut into security elements with the desired form, preferably strips or bands. In a last step this security element is connected with the security document material. The element can be for example embedded in the document material as a security thread or fastened all over to the document surface. The carrier foil can also act merely as an intermediate carrier, i.e. the layer structure consisting of negative writing and magnetic coding is transferred to the document by means of an adhesive or lacquer and the carrier foil then removed. In this case one must sure the order is right when producing the layers on the intermediate carrier so that the magnetic coding comes to lie under the negative writing on the document.

DESCRIPTION OF THE DRAWINGS

Further embodiments of the subject matter of the invention and their advantages will be explained more closely with reference to the following figures, in which.

DETAILED DESCRIPTION

Figure 1:
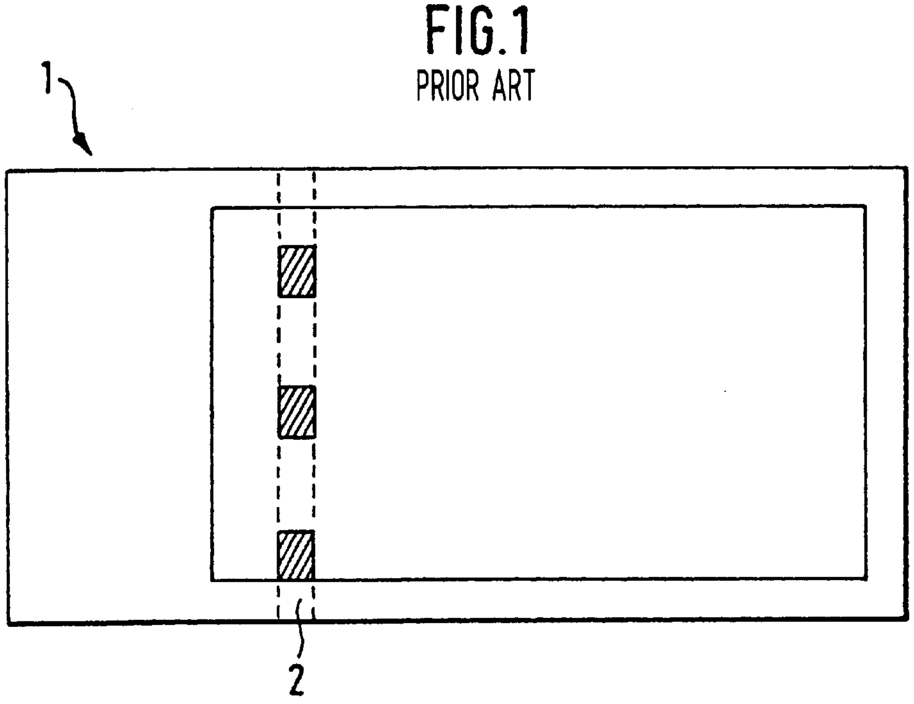
FIG.1 PRIOR ART
FIG. 1 shows a security document according to the invention.

FIG. 1 shows an inventive security document, here a bank note, in which security element 2 is embedded in the form of a so-called window security thread. The security thread is quasi woven into the paper pulp during papermaking so that it passes directly to the document surface at regular intervals, which is indicated by the hatched boxes. Alternatively it is also possible, however, to embed the thread completely in the paper or connect it with the document material such that it can be seen all over on the surface. Also, security element 2 need of course not necessarily be incorporated in the form of a strip or band. In particular if the security element is applied all over to the surface of the security document, other outline forms such as a circular mark can also be advantageous.

Figure 2:
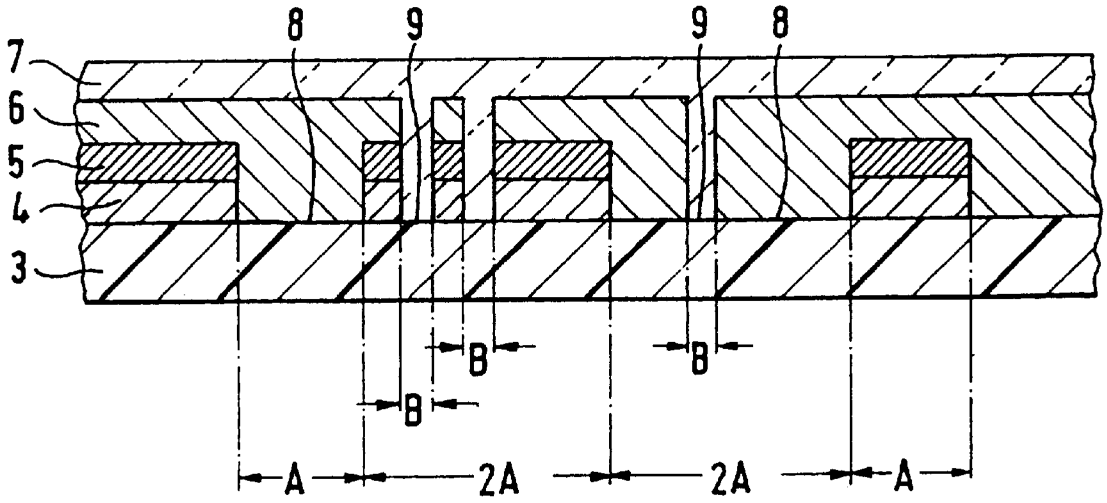
FIG. 2 shows a basic layer structure of the inventive security element.
Figure 3A:
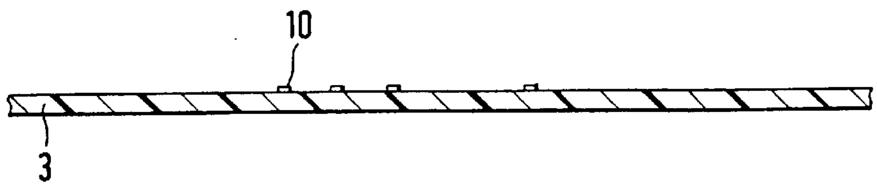
FIGS. 3 to 18 show method variants for producing the inventive security element.
Figure 3B:
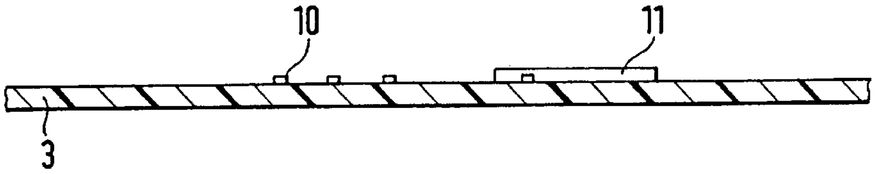
Figure 3C:
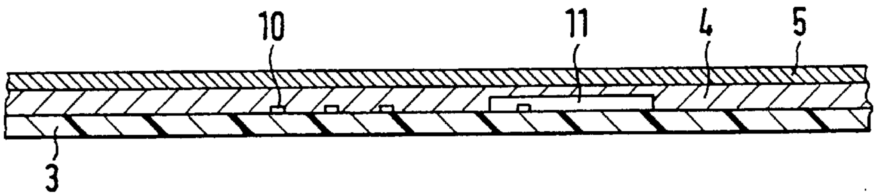
Figure 3D:
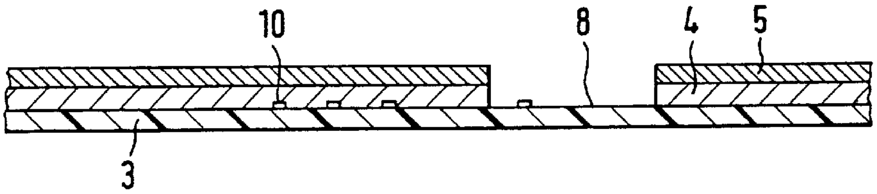
Figure 3E:
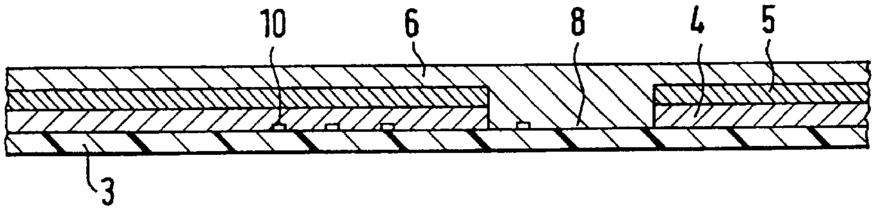
Figure 3F:
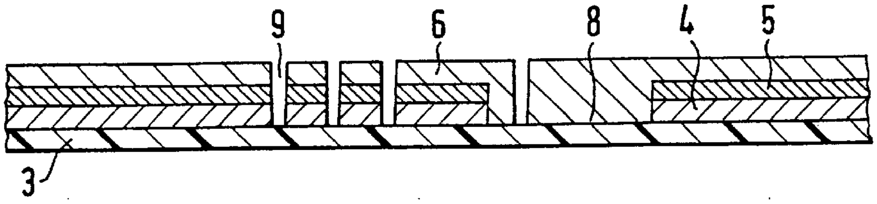
Figure 3G:
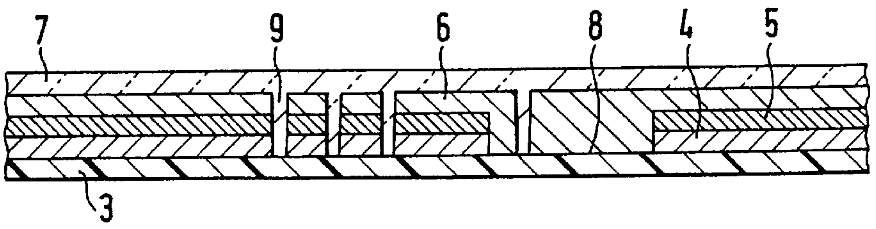
Figure 4A:
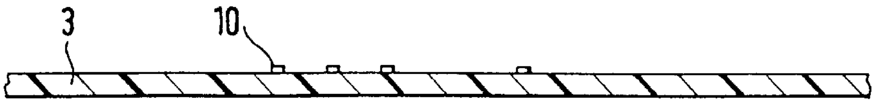
Figure 4B:
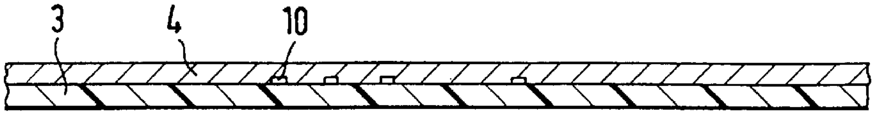
Figure 4C:
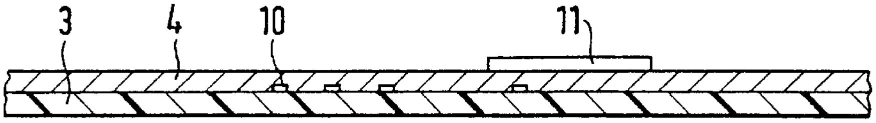
Figure 4D:
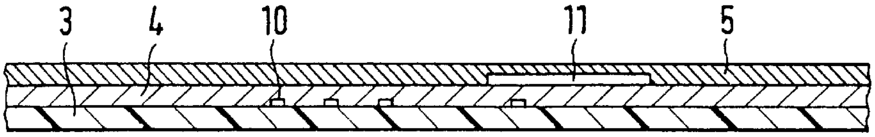
Figure 4E:
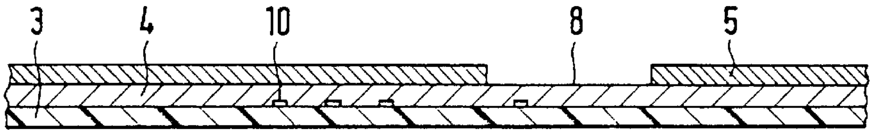
Figure 4F:
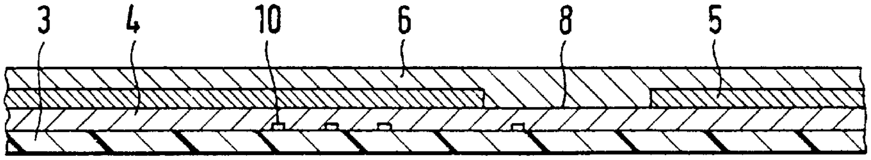
Figure 4G:
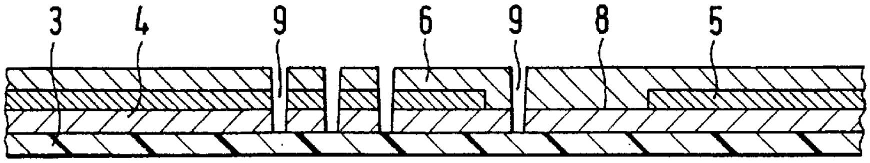
Figure 4H:
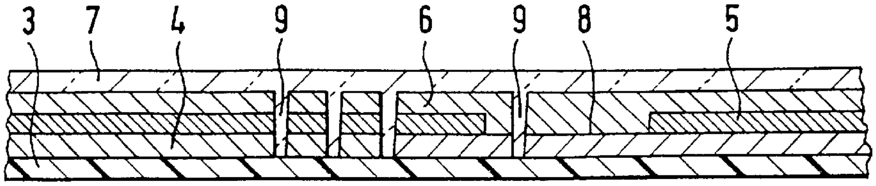
Figure 5A:
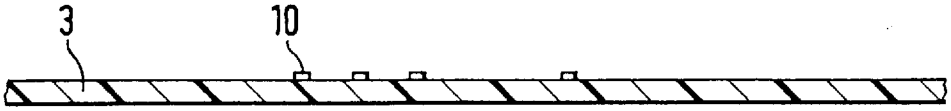
Figure 5B:
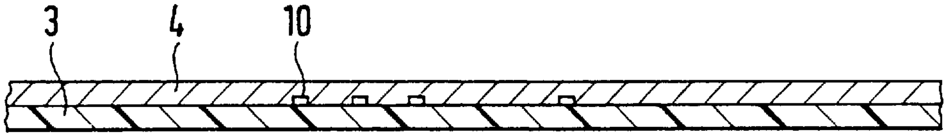
Figure 5C:
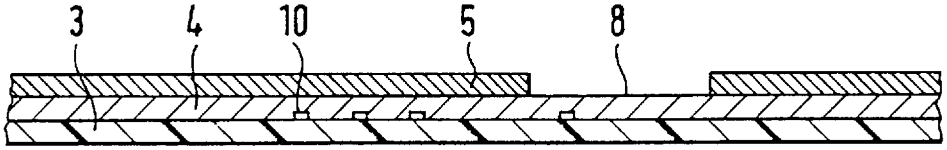
Figure 5D:
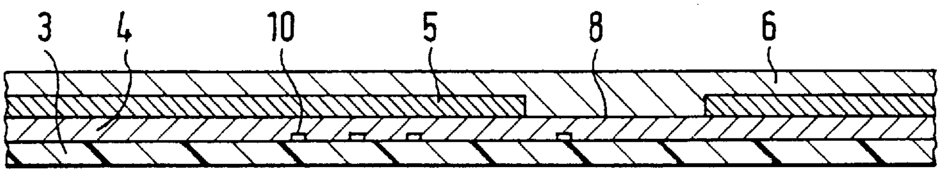
Figure 5E:
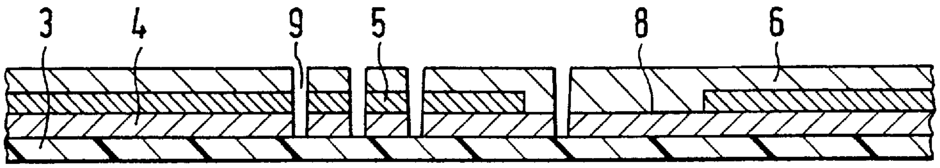
Figure 5F:
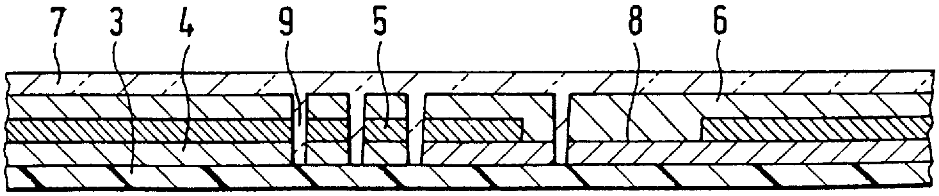
Figure 6A:
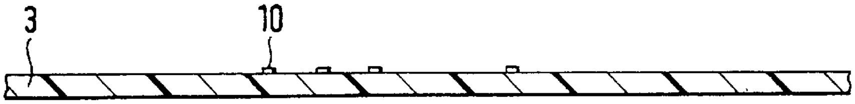
Figure 6B:
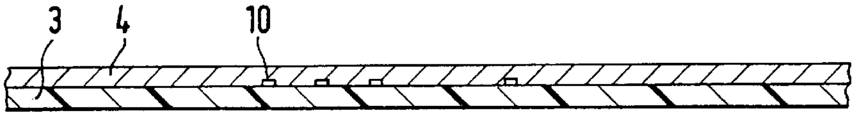
Figure 6C:
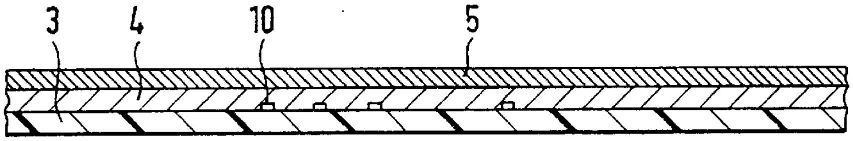
Figure 6D:
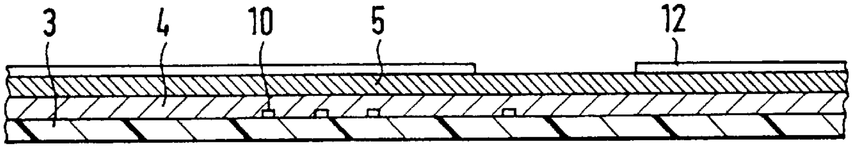
Figure 6E:
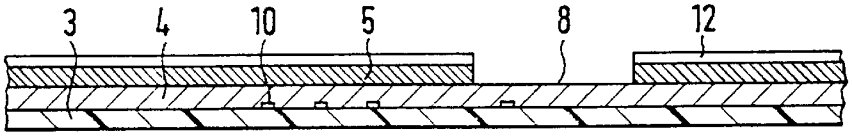
Figure 6F:
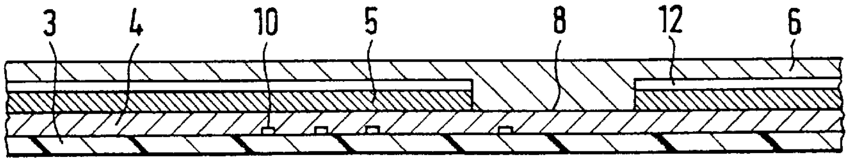
Figure 6G:
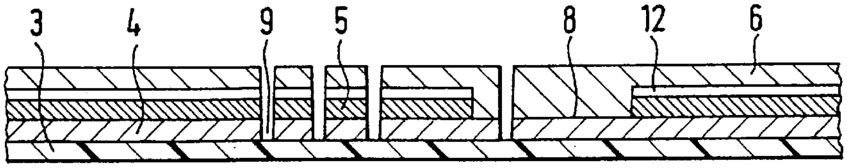
Figure 6H:
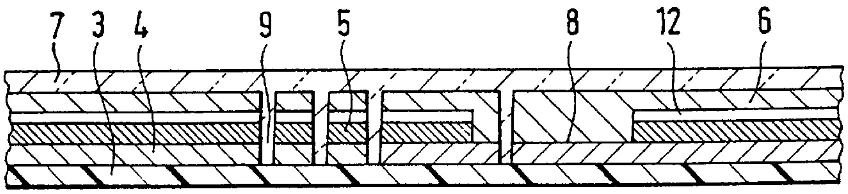
Figure 7A:
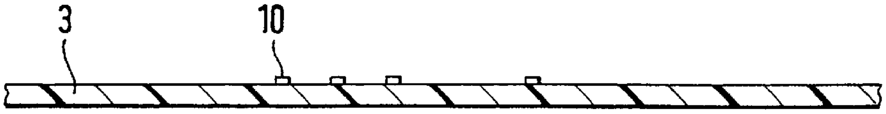
Figure 7B:
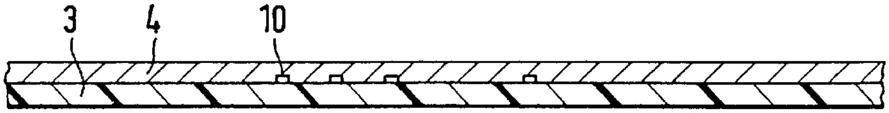
Figure 7C:
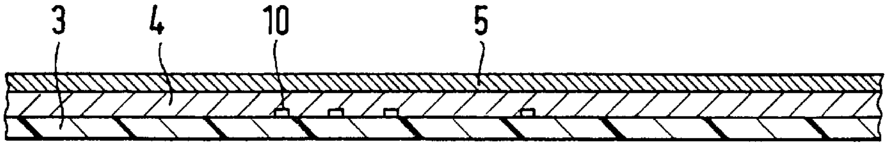
Figure 7D:
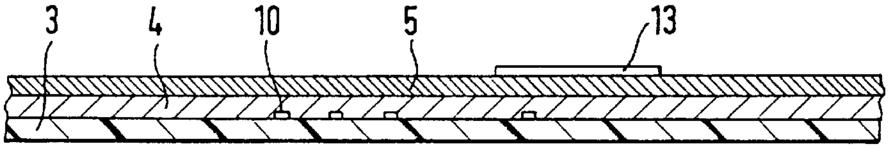
Figure 7E:
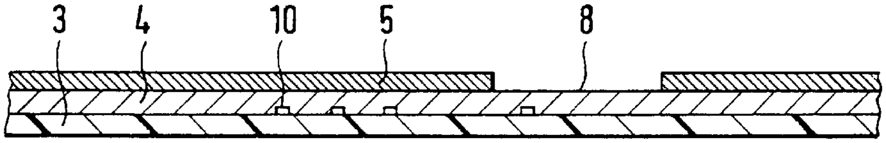
Figure 7F:
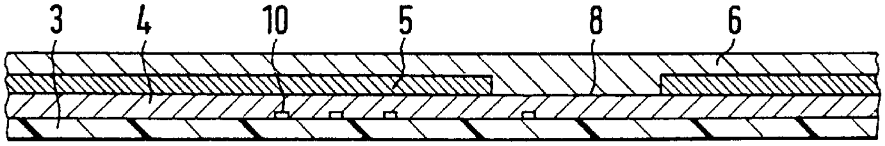
Figure 7G:
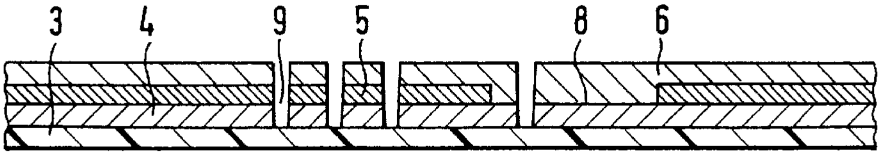
Figure 7H:
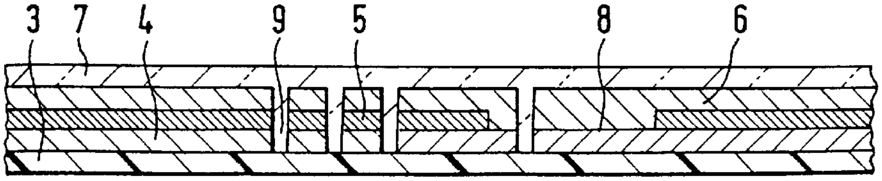
Figure 8A:
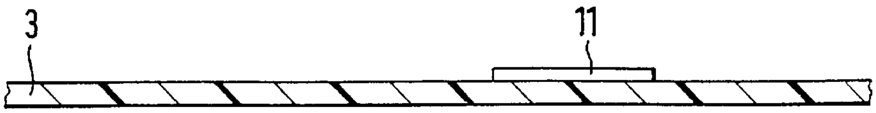
Figure 8B:
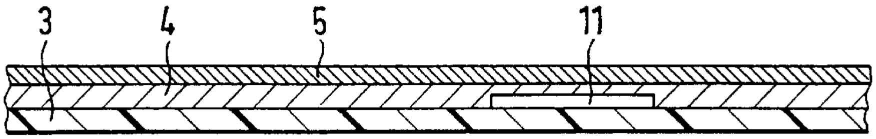
Figure 8C:
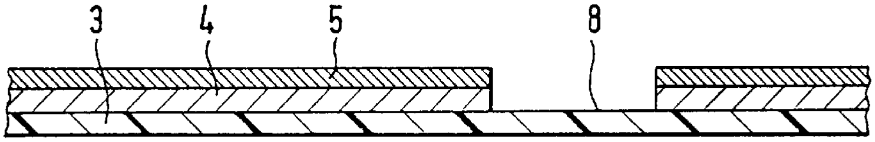
Figure 8D:
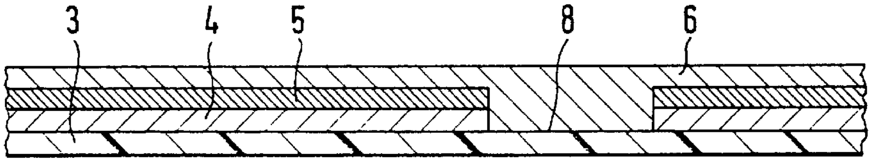
Figure 8E:
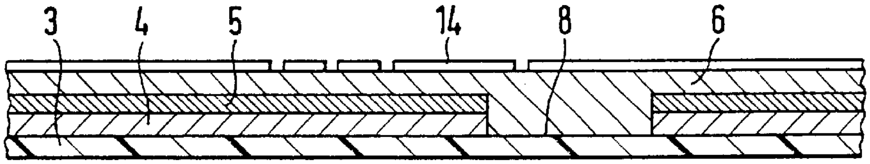
Figure 8F:
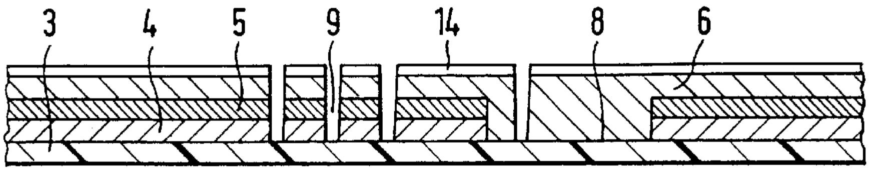
Figure 8G:
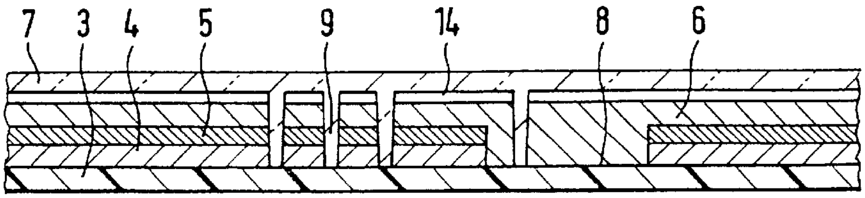

FIG. 2 shows the basic layer structure of inventive security element 2. It consists of carrier foil 3, which can optionally be lacking if the element is fastened to the document surface. On carrier foil 3 there are opaque first cover layer 4 (also referred to herein as lower cover layer 4), magnetic layer 5, second cover layer 6 and optionally transparent protective layer 7. Opaque first cover layer 4 and magnetic layer 5 are present on carrier foil 3 only in partial areas and separated from each other by intermediate areas 8. The magnetic areas form any desired coding by their arrangement.

According to a preferred embodiment the carrier foil can be divided into segments of equal length A, each segment corresponding to a binary bit. The coating of bit length A with magnetic material can correspond for example to a "1" and the uncoated segment of same length A to a "0". In the shown representation, intermediate areas 8 and magnetic areas 5 therefore constitute integral multiples of length A. One of intermediate areas 8 for example has length A while the other has a length of 2 A corresponding to the bit sequence "00". The same applies to magnetic areas 5 shown.

Magnetic areas 5 and lower cover layer 4 additionally have gaps 9 in the form of characters, patterns, etc. Gaps 9 constitute negative characters readable in transmission. Extension B of these characters is in the micron range and thus an order of magnitude below minimum distance A between two magnetic areas 5, which is preferably between 2 to 4 mm.

Cover layer 6 disposed over magnetic areas 5 extends over total security element 2 and has only gaps 9 of the negative characters. Cover layers 4, 6 can consist of any opaque materials, but are preferably vaporized metal layers such as aluminum layers or optically variable layers such as holograms or printing inks with effect pigments (e.g. interference layer pigments, liquid-crystal pigments, bronze powders).

Depending on the production method it is also possible to provide lower cover layer 4 also in the area of code segments 8 free from the magnetic layer.

FIGS. 3 to 18 illustrate the various production methods for an inventive security element. These are different combinations of methods M1 to M5 and V1 to V4 described above.

Combination of Methods M1 and V1

FIG. 3 shows the various method steps necessary for obtaining the inventive security element combining method variants M1 and V1 described above. Carrier foil 3 is printed in step a) with a first separation layer, e.g. a water-soluble ink, in the form of the visually recognizable negative characters. In second method step b) a benzine-soluble ink corresponding to the inverse pattern of the magnetic coding is printed in partial overlap with this water-soluble ink. In step c) lower cover layer 4 and magnetic layer 5 are then applied all over and homogeneously to printed carrier foil 3. This can be done by merely applying a coating compound or by vaporizing. In step d) ink 11 is then dissolved using the suitable solvent, e.g. benzine, thereby washing out superjacent layers 4 and 5. This gives rise to coding segments 8 free from the magnetic layer. Since ink 10 is not soluble in the solvent of ink 11 these printed areas remain unchanged. In further step e) this layer structure is provided with further all-over opaque layer 6. In step f) gaps 9 in the form of the negative characters are produced by treatment with a suitable solvent for ink 10. Finally, in last step g) the finished layer structure of the element can be covered with additional protective layer 7.

Combination of Methods M2 and V1

FIG. 4 shows the production variant according to a combination of methods M2 and V1. Carrier foil 3 is printed with ink 10 in the form of the later negative characters (step a)) and then provided all over with first cover layer 4 (step b)). Over cover layer 4 activable ink 11 is applied in the form of the inverse magnetic coding. Inks 10 and 11 are likewise selected so as to be soluble in different solvents. In the subsequent step this layer structure is provided with magnetic layer 5 (step d)) and ink 11 then activated so that coding segments 8 free from the magnetic layer arise (step e)). In step f) the all-over coating with second cover layer 6 is performed and then the activation of ink 10 (step g)) for producing negative characters 9. Finally protective layer 7 can be applied in step h).

Combination of Methods M3 and V1

FIG. 5 shows a production variant according to a combination of methods M3 and V1. In step a) carrier foil 3 is printed with first separation layer 10 and then coated all over with first cover layer 4 (step b)). Finally magnetic layer 5 is printed or transferred by the transfer method in the form of the desired magnetic coding, whereby intermediate areas 8 remain free from the coating (step c)). In step d) the coating with second cover layer 6 is performed. In subsequent step e) ink 10 is activated so that the superjacent sequence of layers is removed and readable negative characters 9 remain (step e)). Finally the element can be coated with additional protective layer 7 (step f)).

Combination of Methods M4 and V1

FIG. 6 shows the production variant according to a combination of methods M4 and V1. Here too carrier foil 3 is printed in first step a) with soluble ink 10 in the form of the later negative characters. Then first cover layer 4 is first provided all over on the printed side of the carrier foil (step b)) and magnetic layer 5 likewise applied all over (step c)). In subsequent step d) the magnetic layer is printed with strongly adhesive ink 12 in the form of the coding. Layer 12 is resistant to solvents of magnetic layer 5 so that in subsequent dissolving process e) only the unprinted areas are detached, giving rise to coding segments 8 free from the magnetic layer. In step f) the coating with second cover layer 6 is finally performed. The following activation of ink 10 in step g) gives rise to gaps 9 in the form of the negative characters in the total layer structure. In optional step h) the inventive layer structure can finally be provided with further protective layer 7.

Combination of Methods M5 and V1

FIG. 7 shows a production variant according to the combination of methods MS and V1. Here too carrier foil 3 is printed in a first step with soluble ink 10 in the form of the later negative characters (step a)) and then provided with first cover layer 4 and magnetic layer 5 (steps b) and c)). Finally magnetic layer 5 is printed with caustic ink 13 in the form of the inverse magnetic coding (step d)) so that in this area the magnetic layer is removed and coding areas 8 free from the magnetic layer arise (step e)). Then the coating with second cover layer 6 is performed again (step f)), ink 10 activated to produce negative characters 9 (step g)), and further protective layer 7 optionally provided (step h)).

Combination of Methods M1 and V2

FIG. 8 shows the production variant according to a combination of methods M1 and V2. Carrier foil 3 is printed in first step a) with activable ink 11 in the form of the inverse magnetic coding and then in step b) coated or vaporized all over with first cover layer 4 and magnetic layer 5. In subsequent step c) ink 11 is activated so that coding segments 8 free from the magnetic layer arise. In step d) the coating with second cover layer 6 is performed. All-over cover layer 6 is printed in step e) with strongly adhesive and solvent-resistant ink 14 in the form of the inverse later negative characters. Then the layer structure is subjected to a dissolving process (step f)) in which the areas not covered by ink 14 are dissolved except for the carrier foil, giving rise to negative characters 9. The layer structure can again be provided in optional step g) with further protective layer 7.

Combination of Methods M2 and V2

Figures 9A, 9B, 9C, 9D, 9E, 9F, 9G, 9H:
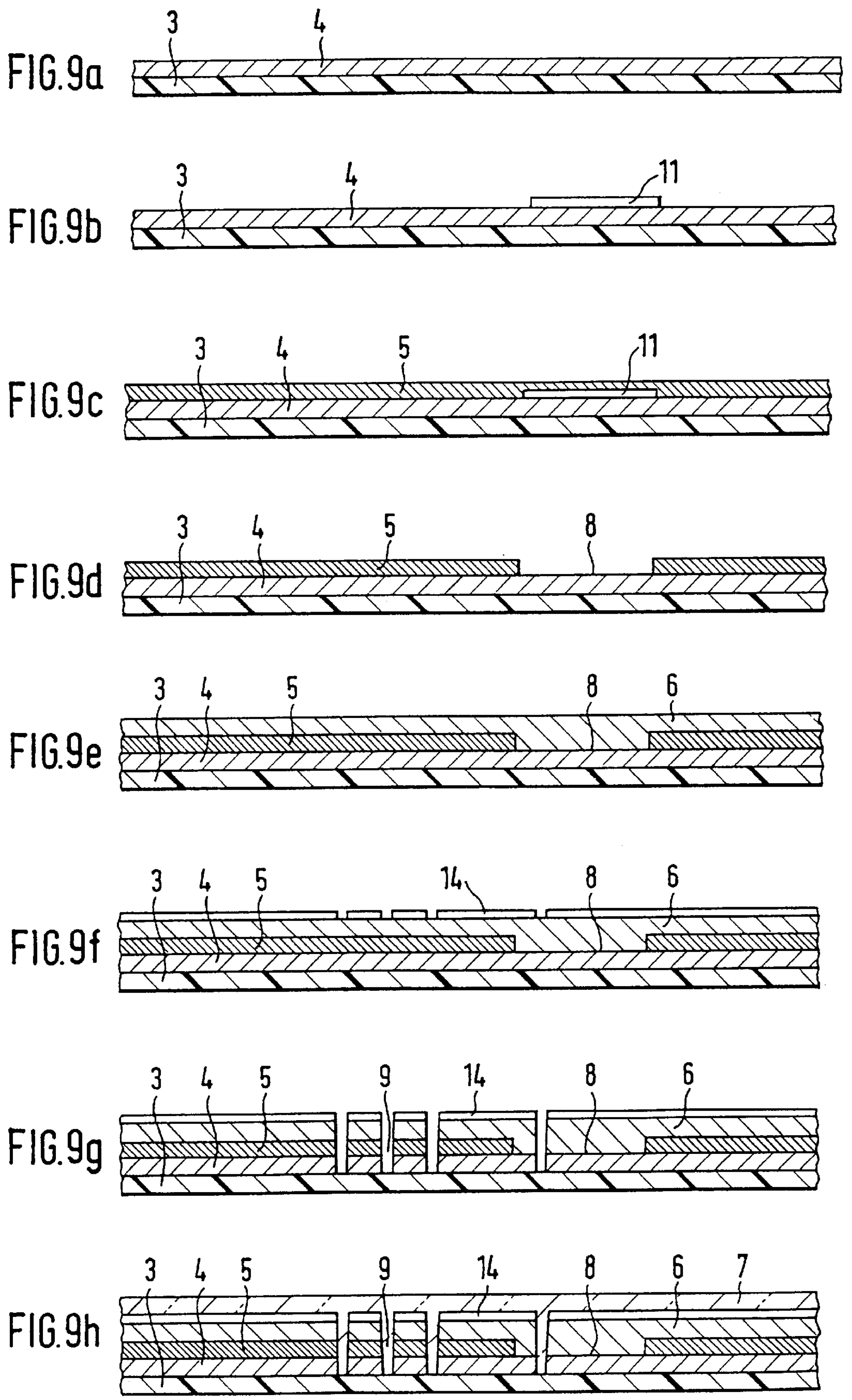
Figure 10A:
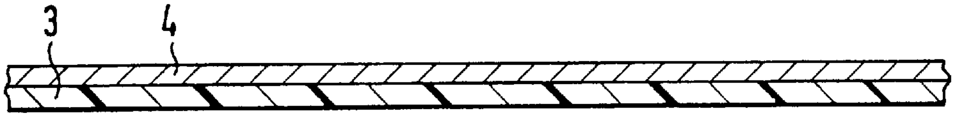
Figure 10B:
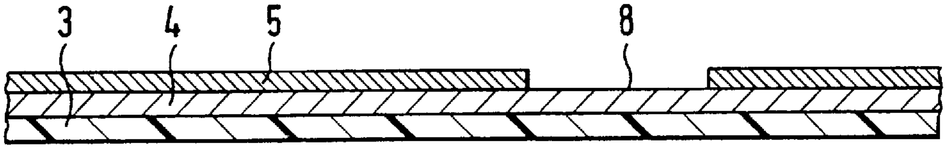
Figure 10C:
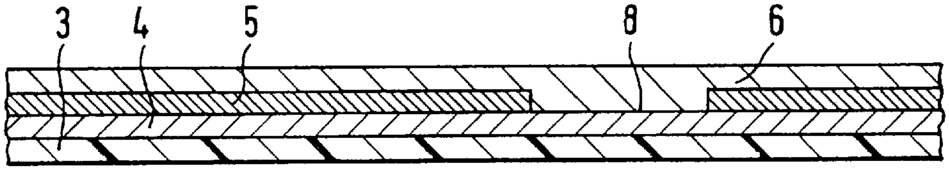
Figure 10D:
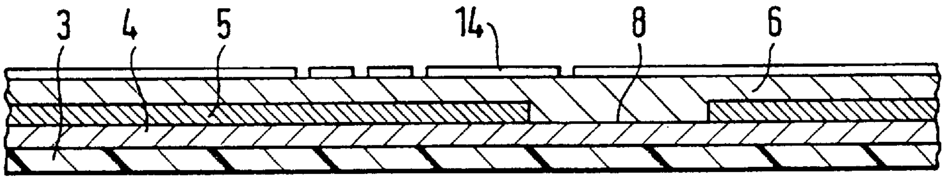
Figure 10E:
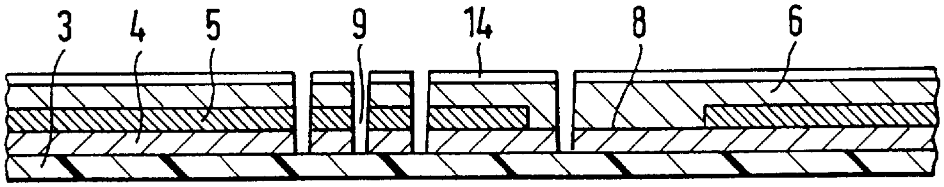
Figure 10F:
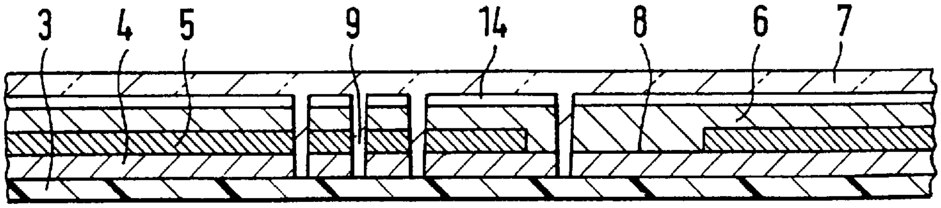
Figure 11A:
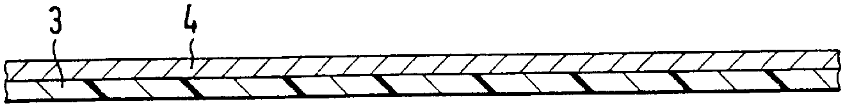
Figure 11B:
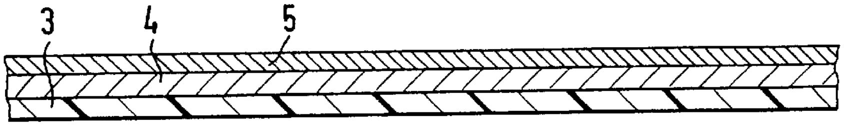
Figure 11C:
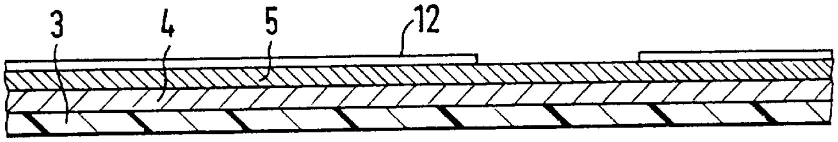
Figure 11D:
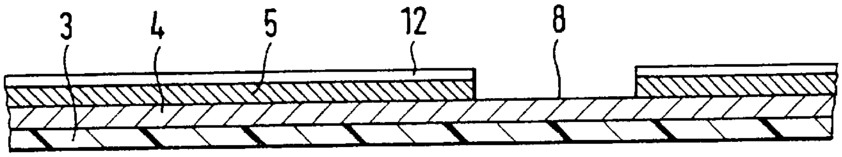
Figure 11E:
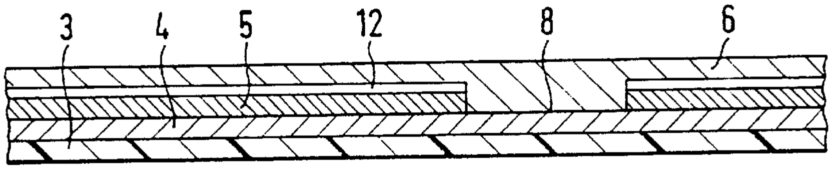
Figure 11F:
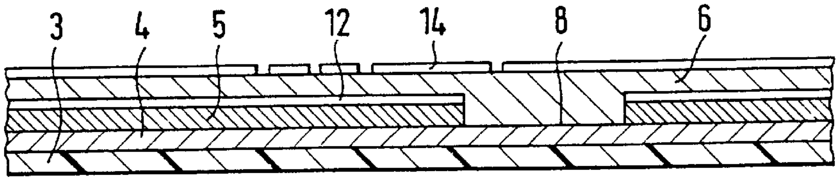
Figure 11G:
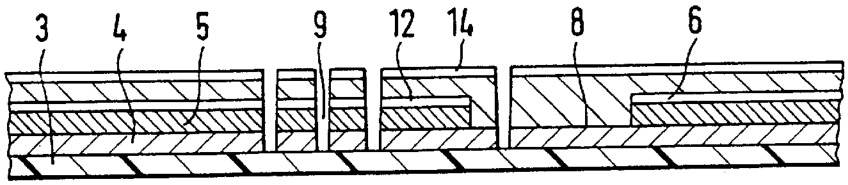
Figure 11H:
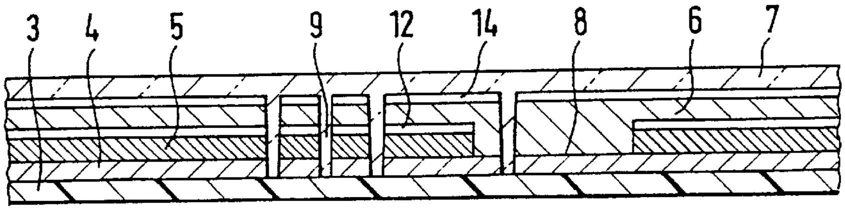
Figure 12A:
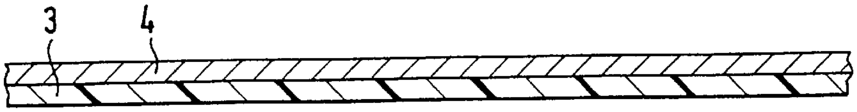
Figure 12B:
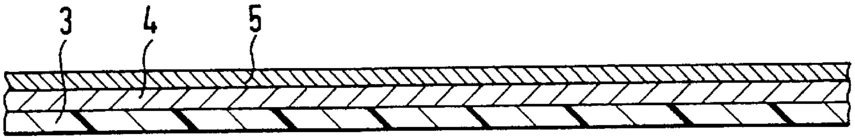
Figure 12C:
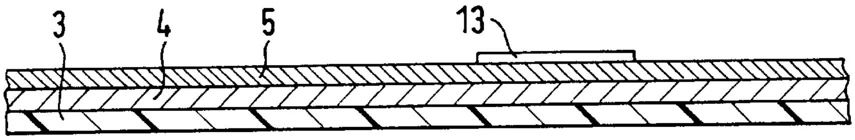
Figure 12D:
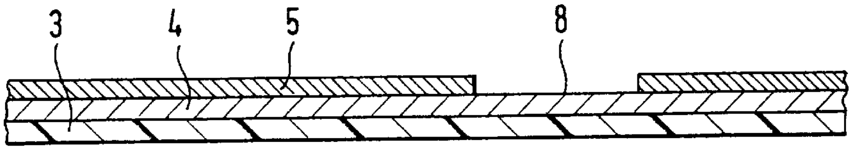
Figure 12E:
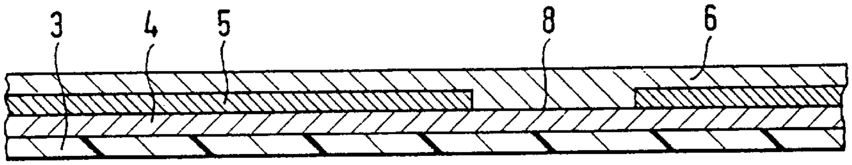
Figure 12F:
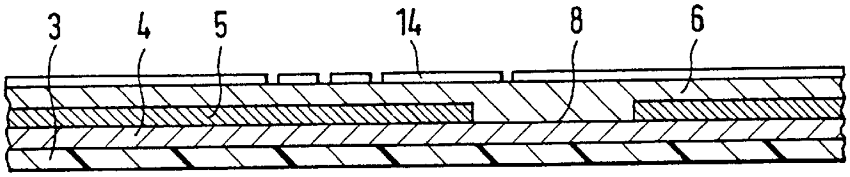
Figure 12G:
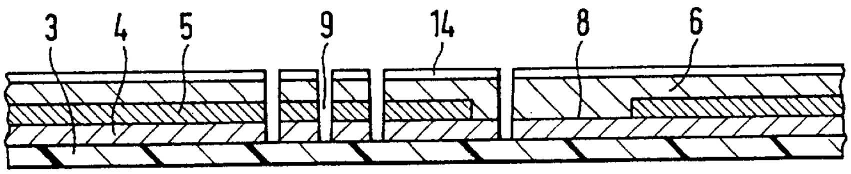
Figure 12H:
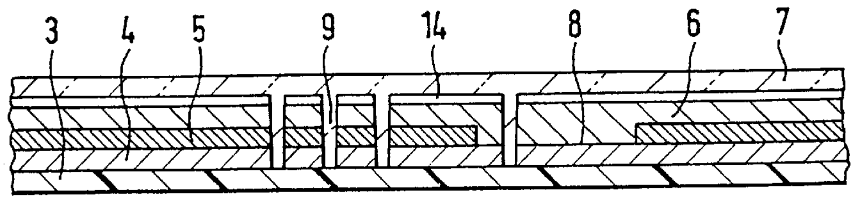
Figure 13A:
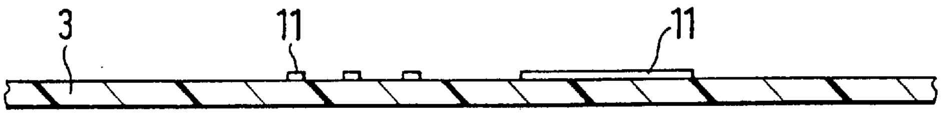
Figure 13B:
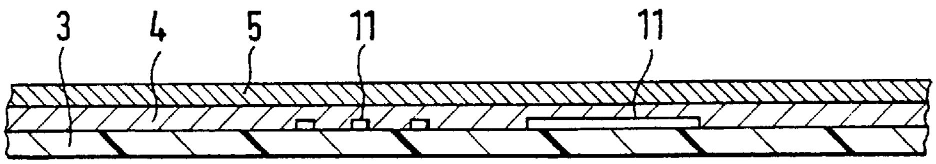
Figure 13C:
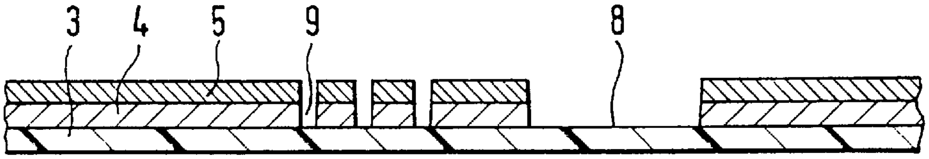
Figure 13D:
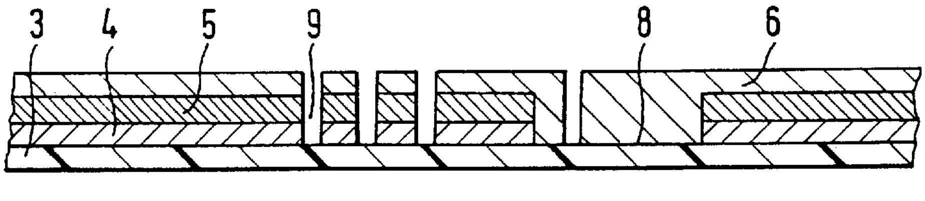
Figure 13E:
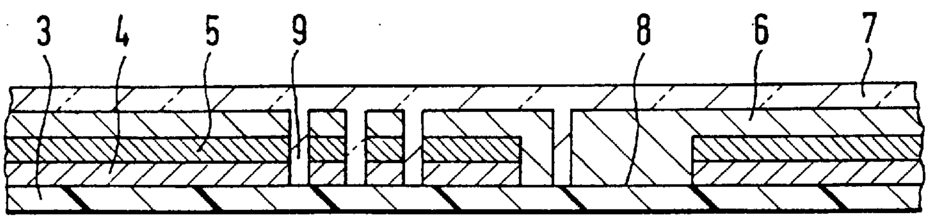
Figure 14A:
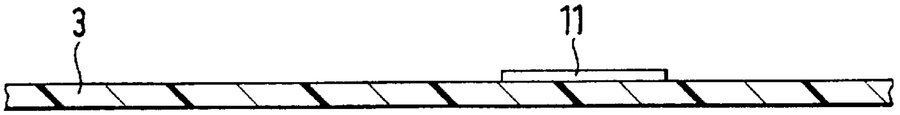
Figure 14B:
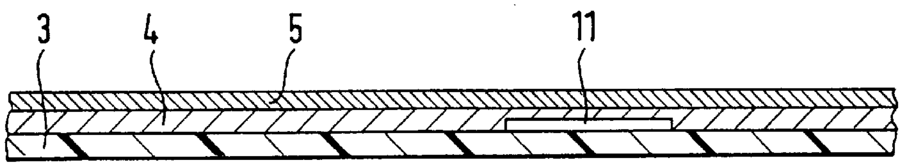
Figure 14C:
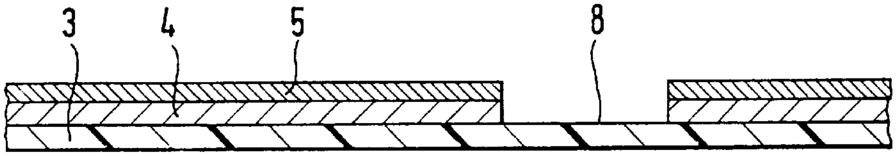
Figure 14D:
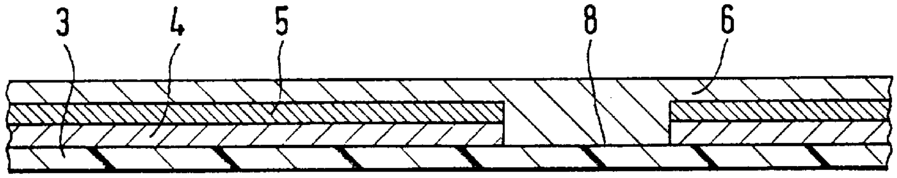
Figure 14E:
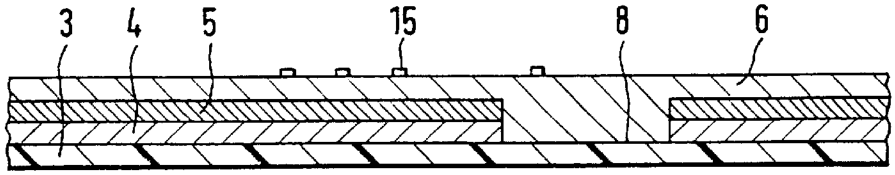
Figure 14F:
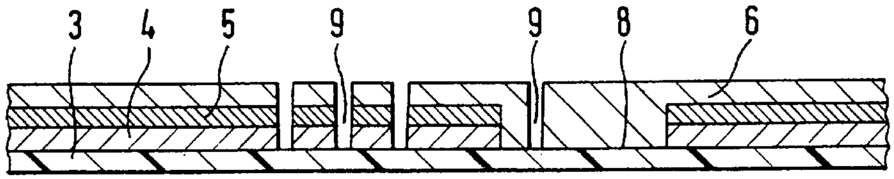
Figure 14G:
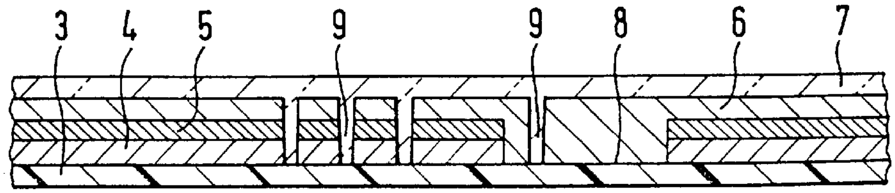
Figure 15A:
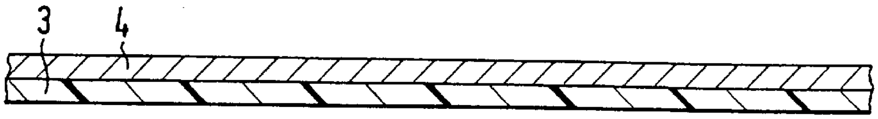
Figure 15B:
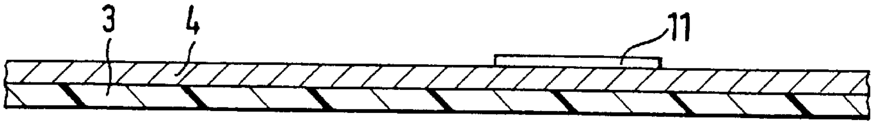
Figure 15C:
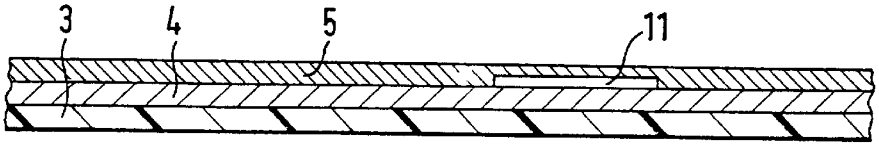
Figure 15D:
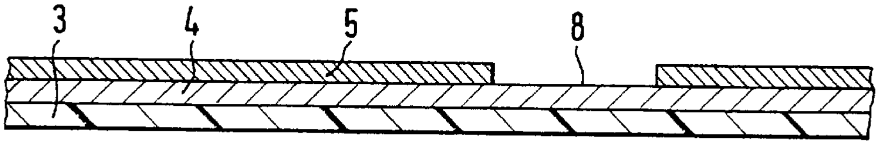
Figure 15E:
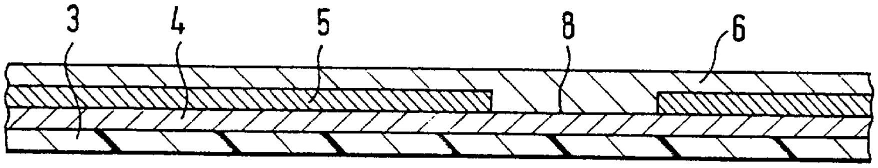
Figure 15F:
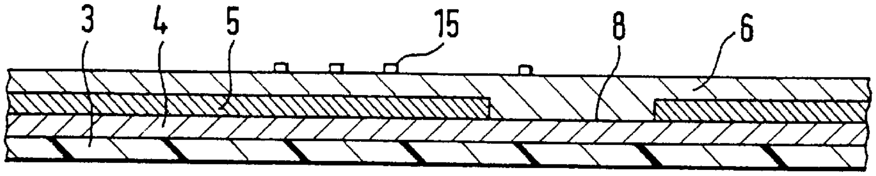
Figure 15G:
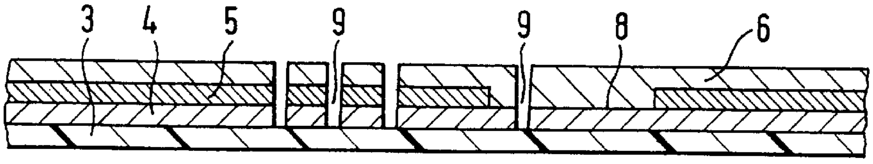
Figure 15H:
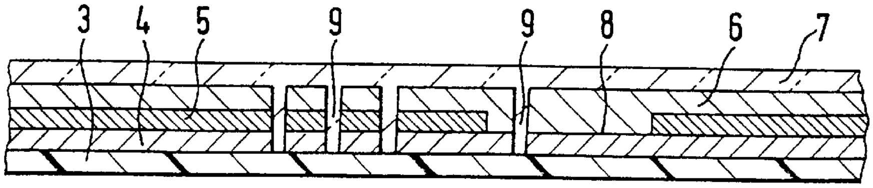
Figure 16A:
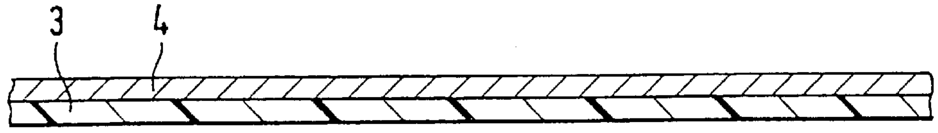
Figure 16B:
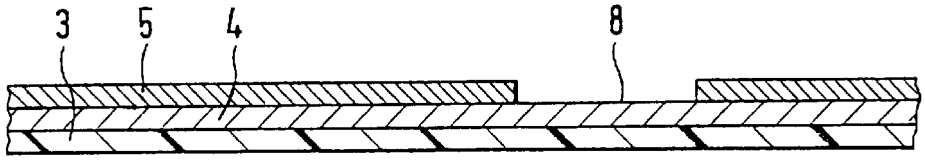
Figure 16C:
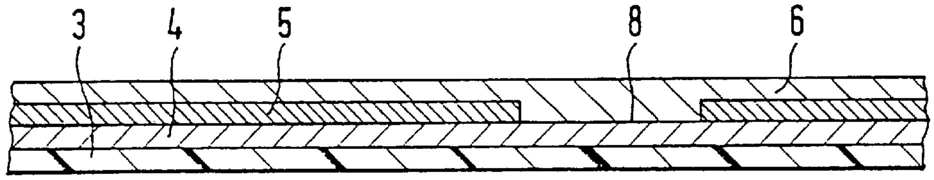
Figure 16D:
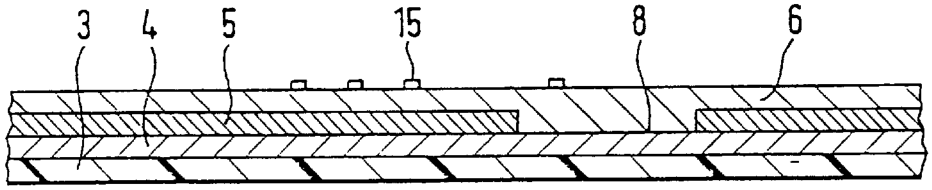
Figure 16E:
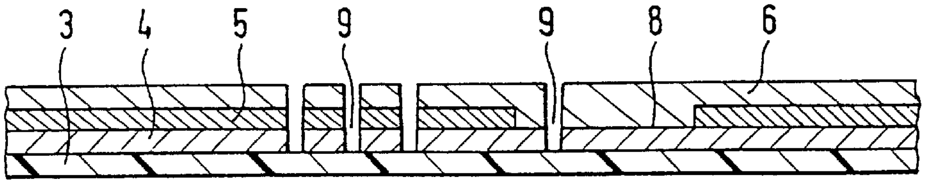
Figure 16F:
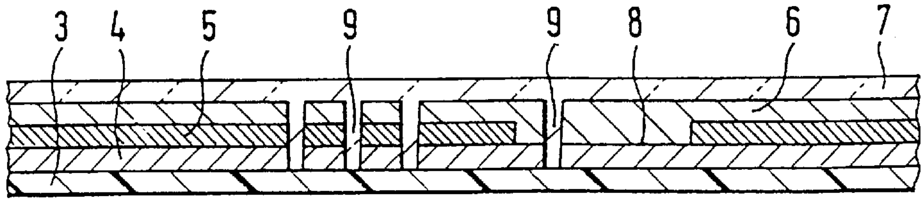
Figure 17A:
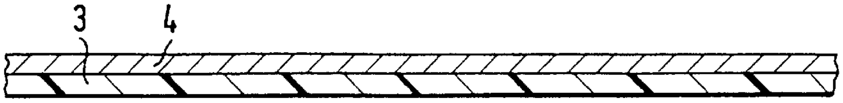
Figure 17B:
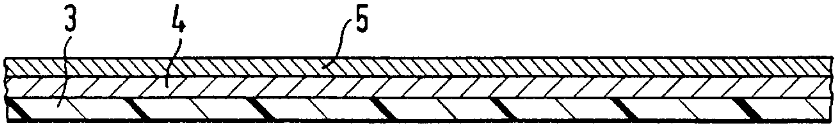
Figure 17C:
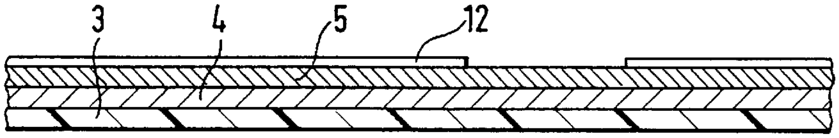
Figure 17D:
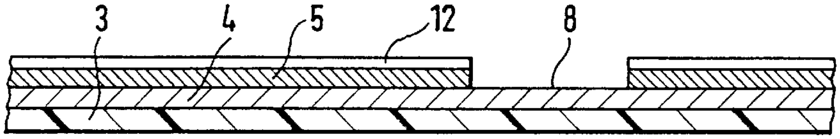
Figure 17E:
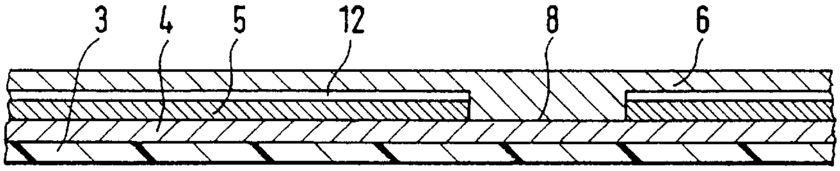
Figure 17F:
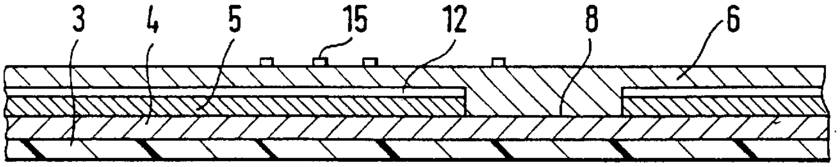
Figure 17G:
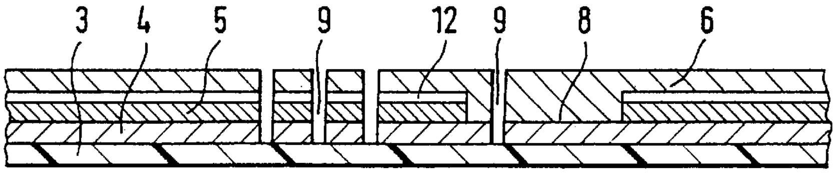
Figure 17H:
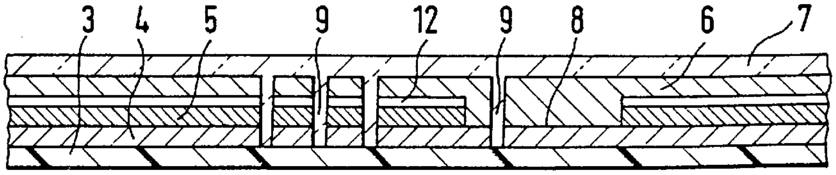
Figure 18A:
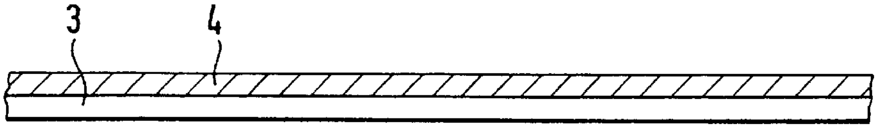
Figure 18B:
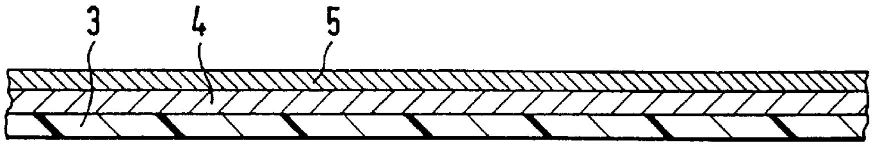
Figure 18C:
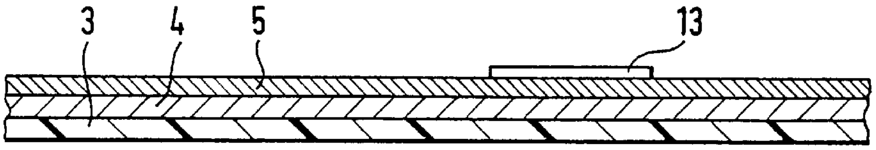
Figure 18D:
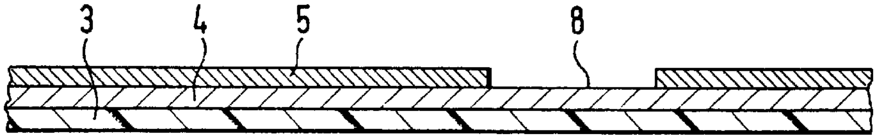
Figure 18E:
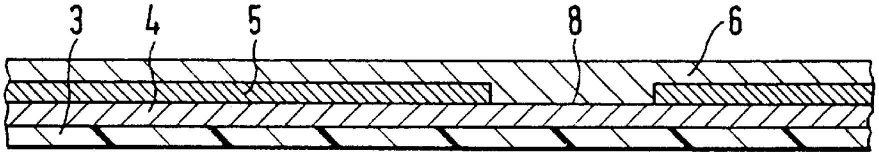
Figure 18F:
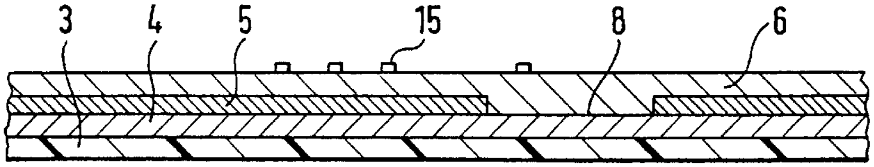
Figure 18G:
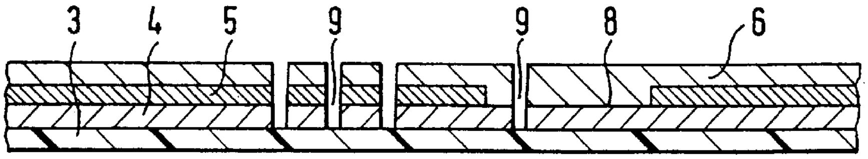
Figure 18H:
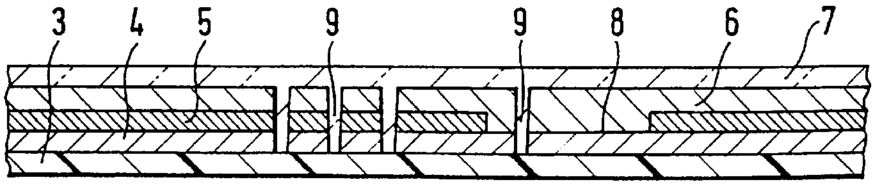

FIG. 9 shows the production variant according to a combination of methods M2 and V2. In this case carrier foil 3 is first provided all over with lower cover layer 4 (step a)). The inverse of the magnetic coding is printed thereon with activable ink 11 (step b)). In step c) magnetic layer 5 is finally provided on the layer structure uniformly and all over. In subsequent step d) ink 11 is activated, thereby removing magnetic layer 5 in the area of ink 11 so that coding segments 8 free from the magnetic layer arise. In subsequent step e) second cover layer 6 is provided all over on the layer structure, and then printed in step f) with strongly adhesive and solvent-resistant ink 14 in the form of the inverse later negative characters. In next step g) the layer structure is treated with a solvent which detaches both cover layers 4 and 6 and magnetic layer 5 from carrier foil 3 in the areas which are not covered by solvent-resistant layer 14 (step g)). In this way negative characters 9 are produced. Finally the total layer structure can be provided in optional step h) with protective layer 7.

Combination of Methods M3 and V2

FIG. 10 shows the production variant according to a combination of methods M3 and V2. In this case carrier foil 3 is provided with first cover layer 4 (step a)), as described in the preceding production variants. In step b) the magnetic coding is produced directly by printing an ink containing magnetic pigments. In steps c) to e) one then produces negative characters 9 by first providing second cover layer 6 over magnetic coding 5, then printing it with solvent-resistant ink 14 in the form of the inverse negative characters and finally treating the layer structure with a solvent in order to produce negative characters 9. Finally the total layer structure can be provided with protective layer 7, as in all the other variants.

Combination of Methods M4 and V2

FIG. 11 shows the production variant according to a combination of methods M4 and V2. In steps a) and b) carrier foil 3 is provided all over with first cover layer 4 and magnetic layer 5. Subsequently the inverse of the magnetic coding is applied with strongly adhesive, solvent-resistant ink 12. In step d) the layer structure is finally treated with a solvent which detaches only magnetic layer 5 and not cover layer 4, so that coding segments 8 free from the magnetic layer arise above first cover layer 4. In the next step the layer structure is likewise provided all over with second cover layer 6 (step e)) and then printed with solvent-resistant ink 14 in the form of the inverse negative characters (step f)). In step g) one produces negative characters 9, as described above, by detaching layers 4, 5, 12, 6 in the areas where ink 14 is not present. In step h) protective layer 7 can finally be provided as a covering again.

Combination of Methods M5 and V2

FIG. 12 shows the production variant according to a combination of methods M5 and V2. The carrier foil is likewise provided all over with first cover layer 4 and magnetic layer 5 (steps a) and b)). Then in step c) the inverse of the magnetic coding, i.e. the area of the later areas free from the magnetic layer, is printed with a caustic ink containing an acid or suitable solvent. The caustic or solvent ink removes only magnetic layer 5 so that coding segments 8 free from the magnetic layer arise. Then, as described in the above examples, the layer structure is covered all over with second cover layer 6 (step e)), a solvent-resistant ink is printed in the form of the inverse of the negative characters (step f)), and the layer structure is then detached in the unprinted areas to produce negative characters 9 (step g)). Finally protective layer 7 can be provided again (step h)).

Combination of Methods M1 and V3

FIG. 13 shows the production variant according to a combination of methods M1 and V3. In this case both the inverse of the desired magnetic coding and the negative characters are printed on carrier foil 3 with soluble ink 11 as a separation layer. In step b) first cover layer 4 and magnetic layer 5 are disposed all over ink 11. In subsequent step c) ink 11 is activated so that negative characters 9 and coding segments 8 free from the magnetic layer arise. In step d) the layer structure is finally printed in good register with second cover layer 6, whereby negative characters 9 are left out. Finally protective layer 7 can be applied in step e).

The production variants according to a combination of methods M2 to M5 and V3 will not be presented in the following with reference to figures since they virtually do not differ from the production of the magnetic coding in the sequence of method steps. In these variants one must merely also produce gaps for the negative characters in the magnetic layer simultaneously with the magnetic coding. The last step is fundamentally to print the second cover layer which is left out in the area of the negative characters.

Combination of Methods M1 and V4

FIG. 14 shows the production variant according to a combination of methods M1 and V4. Carrier foil 3 is printed in first step a) with activable ink 11 in the form of the inverse magnetic coding and then in step b) coated or vaporized all over with first cover layer 4 and magnetic layer 5. In subsequent step c) ink 11 is activated so that coding segments 8 free from the magnetic layer arise. Then the coating with second cover layer 6 is performed (step d)). A caustic ink containing for example an acid, solvent or complexing agent is applied to cover layer 6 in the form of the later negative characters. Caustic ink 15 must be selected so that it can remove both cover layers 4 and 6 and magnetic layer 5. This gives rise to negative characters 9 (step f)). In last step g) the layer structure can finally be provided with protective layer 7 again.

Combination of Methods M2 and V4

FIG. 15 shows the production variant according to a combination of methods M2 and V4. Carrier foil 3 is provided in steps a) to e) with the magnetic coding-and second cover layer 6 by providing on carrier foil 3 first cover layer 4 (step a)), soluble layer 11 in the form of the inverse magnetic coding (step b)) and all-over magnetic layer 5 (step c)). Then ink 11 is activated so that coding segments 8 free from the magnetic layer arise (step d)). Finally second cover layer 6 is applied to the layer structure (step e)). In subsequent step f) cover layer 6 is printed with caustic ink 15 in the form of the later negative characters. Ink 15 dissolves layers 4, 5 and 6 so that gaps arise in the layer structure, negative characters 9 (step g)). Optionally protective layer 7 can finally be provided (step h)).

Combination of Methods M3 and V4

FIG. 16 shows the production variant according to a combination of methods M3 and V4. In accordance with method M3 carrier foil 3 is first printed with first cover layer 4 and then with magnetic coding 5 (steps a) and b)). Subsequently second cover layer 6 is applied (step c)). As described above, the treatment with caustic ink 15 in the form of the later gaps is now performed, giving rise to negative characters 9 (steps d) and e)). Finally protective layer 7 can be provided in step f) again.

Combination of Methods M4 and V4

FIG. 17 shows the production variant according to a combination of methods M4 and V4. Carrier foil 3 already provided all over with lower cover layer 4 (step a)) has magnetic layer 5 applied thereto all over (step b)). Subsequently the pattern of the magnetic coding is printed with insoluble ink 12 (step c)). In step d) magnetic layer 5 is detached in the unprinted areas. In next step e) second cover layer 6 is applied, and in steps f) and g) the treatment with caustic ink 15 is performed, giving rise to negative characters 9. Finally the layer structure can be covered with protective layer 7 (step h)).

Combination of Methods M5 and V4

FIG. 18 shows the production variant according to a combination of methods M5 and V4. In this method, as described repeatedly above, carrier foil 3 is first coated or vaporized all over with cover layer 4 and then with magnetic layer 5 (steps a) and b)). Then the layer structure is treated with caustic ink 13 which detaches the unwanted parts of magnetic layer 5 thereby producing coding segments 8 free from the magnetic layer (steps c) and d)). Subsequently one produces the negative characters in the total layer structure by first applying cover layer 6 (step e)) and subsequently performing the treatment with further caustic ink 15 which produces the gaps or negative characters 9 (steps f) and g)). Finally the layer structure can be provided with protective layer 7 (step h)).

The untreated surface of the carrier foil can of course be provided in all method variants with further layers, such as all-over, semitransparent metal layers or luminescent prints.

The various method steps are preferably performed in a continuous method on a plastic foil in web form. Then the finished foil is cut into security elements of the desired form and these are connected with the document material. The element can be embedded in the document material during production of the document, e.g. as a window security thread. If the element is to be disposed on the document surface the element is connected with the document material via a suitable adhesive layer, whereby the carrier foil preferably comes to lie on the side facing away from the document as a protective layer.

Alternatively the endless carrier material can also be used as a transfer foil. In this case the carrier foil must be prepared such that the layer structure can be detached therefrom, e.g. by providing a special separation layer.

What is claimed is:

1. A method of producing a security element for a security document, comprising the steps of:

providing at least a first layer and a magnetic layer disposed below the first layer;

forming first gaps in said first layer and said magnetic layer, said first gaps forming negative characters readable upon transmission of light through said document;

forming a magnetic coding by providing second gaps in said magnetic layer, wherein said first gaps of said first layer extend through said magnetic layer where no second gaps are located in said magnetic layer, and wherein said first gaps are an order of magnitude smaller than said second gaps such that readability of said coding in said magnetic layer is not impaired in areas where said first gaps extend through said magnetic layer.

2. The method of claim 1, wherein said step of forming a magnetic coding by providing second gaps in said magnetic layer comprises the steps of:

a) printing a translucent plastic foil with an activable ink in the form of an inverse coding;

b) applying a magnetic layer all over the activable ink;

c) activating the ink so that the magnetic layer is removed in an area of the ink.

3. The method of claim 1, wherein said step of forming a magnetic coding by providing second gaps in said magnetic layer comprises the step of applying the magnetic layer in the form of a desired coding.

4. The method of claim 3, wherein said step of forming a magnetic coding by providing second gaps in said magnetic layer comprises the steps of printing the coding with a magnetic ink or transferring the coding to a foil using a transfer method.

5. The method of claim 1, wherein said step of forming a magnetic coding by providing second gaps in said magnetic layer comprises the steps of:

a) applying the magnetic layer all over a translucent plastic foil;

b) printing the magnetic layer with a strongly adhesive ink in the form of a coding;

c) detaching unprinted magnetic layer areas.

6. The method of claim 5, wherein the plastic foil is provided in a first step with a cover layer.

7. The method of claim 1, wherein said step of forming a magnetic coding by providing second gaps in said magnetic layer comprises the steps of:

a) applying the magnetic layer all over a translucent plastic foil;

b) printing the magnetic layer with a caustic ink in the form of an inverse coding so that unwanted parts of the coding are removed.

8. The method of claim 7, wherein the plastic foil is provided in a first step with a cover layer.

9. The method of claim 1, wherein said step of forming said first gaps in said first layer comprises the steps of:

a) providing an activable printing ink in the form of the gaps;

b) applying the first layer over the activable ink; and c) activating said ink so that the first layer is removed in an area of the ink.

10. The method of claim 1, wherein said step of forming said first gaps in said first layer comprises the steps of:

a) printing the first layer with an ink as strongly adhesive as possible in the form of an inverse of the gaps;

b) removing unprinted areas of the first layer.

11. The method of claim 1, wherein said step of forming said first gaps comprises the step of forming said first layer as a metallic printing ink layer printed such that the first gaps are free of metallic printing ink.

12. The method of claim 1, wherein said step of forming said first gaps comprises the step of printing the first layer with a caustic ink so that printed areas of the first layer are removed.

13. A method of producing a security document that includes a document substrate and a security element (2), said security element (2) having at least a first layer (6) with first gaps (9) which form negative characters readable upon transmission of light through said document and a magnetic layer (5) disposed below said first layer (6), said first layer superposed on said magnetic layer, said magnetic layer (5) having second gaps (8) in the form of a magnetic coding and said first gaps (9) of said first layer (6) extending through said magnetic layer (5) where no second gaps (8) are located in said magnetic layer (5), wherein said first gaps (9) of said first layer (6) are an order of magnitude smaller than said second gaps (8) of said magnetic layer (5) such that readability of said coding in said magnetic layer (5) is not impaired in areas where said first gaps (9) extend through said magnetic layer (5), comprising the step of embedding the security element in the security document to production of the security document.

14. A method of producing a security document that includes a document substrate and a security element (2), said security element (2) having at least a first layer (6) with first gaps (9) which form negative characters readable upon transmission of light through said document and a magnetic layer (5) disposed below said first layer (6), said first layer superposed on said magnetic layer, said magnetic layer (5) having second gaps (8) in the form of a magnetic coding and said first gaps (9) of said first layer (6) extending through said magnetic layer (5) where no second gaps (8) are located in said magnetic layer (5), wherein said first gaps (9) of said first layer (6) are an order of magnitude smaller than said second gaps (8) of said magnetic layer (5) such that readability of said coding in said magnetic layer (5) is not impaired in areas where said first gaps (9) extend through said magnetic layer (5), comprising the step of fastening the security element to a surface of a material of the security document to production of the security document.

15. The method of claim 14, wherein the security element is produced on an intermediate carrier connected with the document via an adhesive or lacquer layer.

* * * * *